US012704679B2

(12) United States Patent
Faulhaber et al.

(10) Patent No.: US 12,704,679 B2
(45) Date of Patent: Aug. 11, 2026

(54) HIGH-BRIGHTNESS COMBINER WITH SHAPED CAPILLARY

(71) Applicant: Lumentum Operations LLC, San Jose, CA (US)

(72) Inventors: Richard D. Faulhaber, San Carlos, CA (US); Martin H. Muendel, Oakland, CA (US); Jeff Gregg, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 276 days.

(21) Appl. No.: 18/535,616

(22) Filed: Dec. 11, 2023

(65) Prior Publication Data

US 2025/0130370 A1 Apr. 24, 2025

Related U.S. Application Data

(60) Provisional application No. 63/591,344, filed on Oct. 18, 2023.

(51) Int. Cl.
*G02B 6/25* (2006.01)
*G02B 6/255* (2006.01)

(52) U.S. Cl.
CPC .................................. *G02B 6/2555* (2013.01)

(58) Field of Classification Search
CPC .................................................... G02B 6/2555
USPC .......................................................... 385/115
See application file for complete search history.

(56) References Cited

U.S. PATENT DOCUMENTS

2010/0118897 A1* 5/2010 Tanigawa ........... G02B 6/02042 385/115
2012/0211145 A1* 8/2012 Tumminelli ......... G02B 6/0008 156/86
2024/0063598 A1* 2/2024 Di Teodoro ...... H01S 3/094007
2024/0329347 A1* 10/2024 Kumar ................ G02B 6/4432

* cited by examiner

*Primary Examiner* — Jerry M Blevins
(74) *Attorney, Agent, or Firm* — Harrity & Harrity, LLP

(57) ABSTRACT

In some implementations, a high-brightness combiner comprises a fiber bundle that comprises a plurality of optical fibers associated with a packing geometry that defines a shape of an outer periphery of the fiber bundle. The high-brightness combiner further comprises a capillary structure, comprising a glass enclosure surrounding the fiber bundle, wherein the capillary structure includes an outer periphery, and an inner periphery with a shape that corresponds to the shape of the outer periphery of the fiber bundle.

20 Claims, 9 Drawing Sheets

300

HIGH-BRIGHTNESS COMBINER WITH SHAPED CAPILLARY

CROSS-REFERENCE TO RELATED APPLICATION

This Patent application claims priority to U.S. Provisional Patent Application No. 63/591,344, filed on Oct. 18, 2023, and entitled "HIGH-BRIGHTNESS COMBINERS WITH SHAPED CAPILLARIES." The disclosure of the prior Application is considered part of and is incorporated by reference into this Patent Application.

TECHNICAL FIELD

The present disclosure relates generally to a capillary-based combiner structure and to a combiner using a shaped capillary structure to control individual fibers during a manufacturing process, maximize brightness conversion, and improve manufacturability.

BACKGROUND

Fiber optic combiners are critical components of high-power fiber lasers. For example, fiber optic combiners may be used to merge light from multiple input signals into a single output fiber or to combine light with different wavelengths into a single output path. Pump combiners are specifically designed to merge multiple pump laser sources into a single fiber. Pump combiners enable efficient energy transfer by combining power from multiple pump lasers into a single optical fiber, which allows amplified signal transmission through a doped fiber. Pump-signal combiners, on the other hand, are used to combine signal and pump sources into a single output fiber. In optical amplifiers or lasers, pump-signal combiners generally merge the signal that requires amplification with one or more pump sources needed to excite the gain medium within the optical amplifier or laser, which can enhance the signal by amplifying the signal through the gain medium while maintaining a single output path. Combiners play a critical role in various applications, including telecommunications, fiber lasers, and optical signal processing, ensuring efficient and reliable signal amplification and transmission in optical fiber systems.

SUMMARY

In some implementations, a high-brightness combiner includes a fiber bundle that comprises a plurality of optical fibers associated with a packing geometry that defines a shape of an outer periphery of the fiber bundle; and a capillary structure, comprising a glass enclosure surrounding the fiber bundle, wherein the capillary structure includes: an outer periphery, and an inner periphery with a shape that corresponds to the shape of the outer periphery of the fiber bundle.

In some implementations, a shaped capillary includes a glass enclosure to surround a fiber bundle that comprises a plurality of optical fibers associated with a packing geometry that defines a shape of an outer periphery of the fiber bundle, wherein the glass enclosure comprises: an outer periphery, and an inner periphery with a shape that corresponds to the shape of the outer periphery of the fiber bundle.

In some implementations, a method for fabricating a high-brightness combiner includes loading, into a capillary structure, a plurality of optical fibers associated with a packing geometry that defines a shape of an outer periphery of a fiber bundle that includes the plurality of optical fibers, wherein the capillary structure is a glass enclosure, surrounding the fiber bundle, that includes: an outer periphery, and an inner periphery with a shape that corresponds to the shape of the outer periphery of the fiber bundle; tapering the capillary structure while a heat source is applied along a length of the outer periphery of the capillary structure; and cleaving the tapered capillary structure at a waist.

DETAILED DESCRIPTION

The following detailed description of example implementations refers to the accompanying drawings. The same reference numbers in different drawings may identify the same or similar elements.

Figure 1:
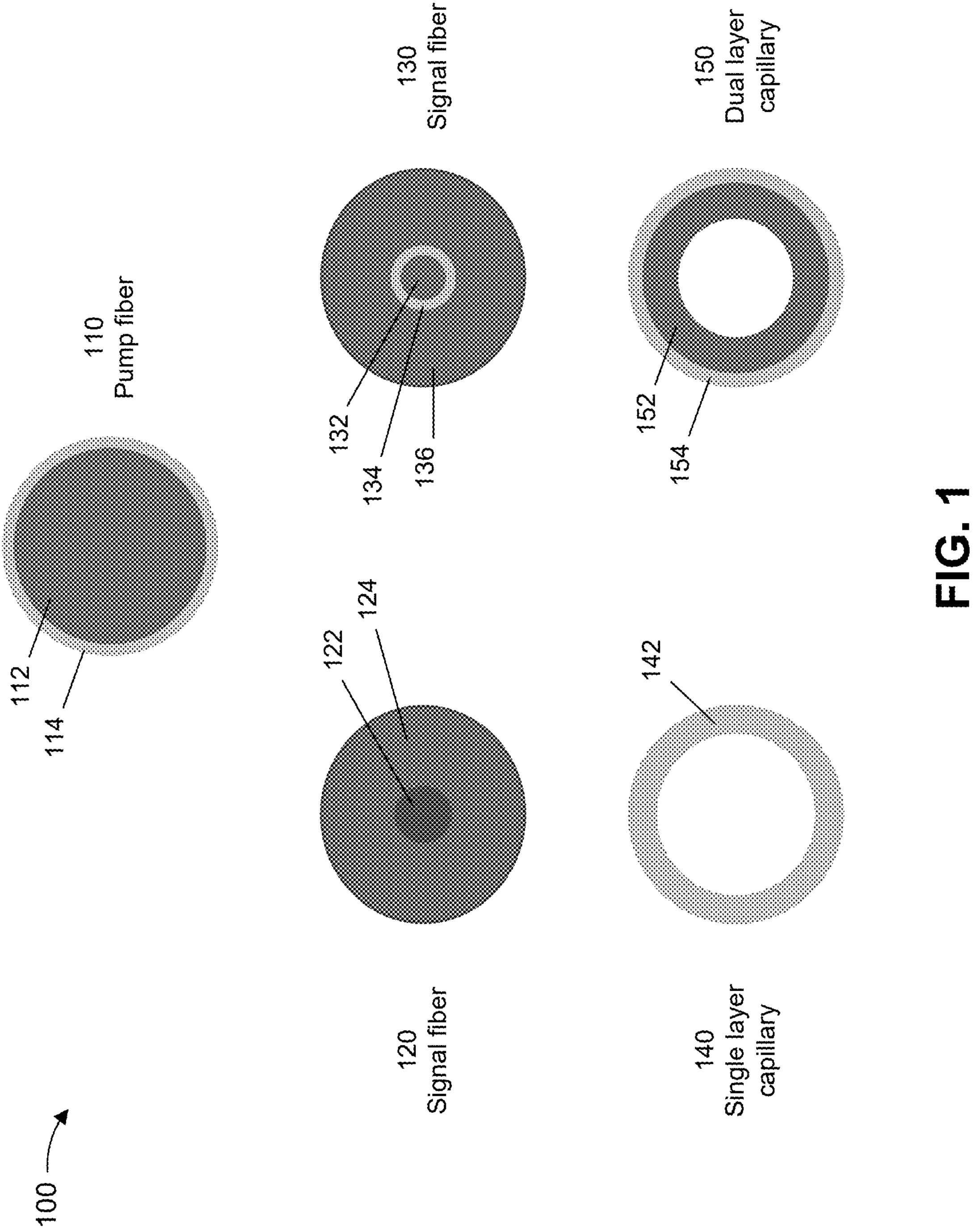
FIG. 1 is a diagram illustrating examples of optical fibers that can be used in a capillary-based combiner.

FIG. 1 is a diagram illustrating examples 100 of optical fibers that can be used in a capillary-based combiner. For example, a combiner for an optical fiber bundle is a device that allows light carried in multiple optical fibers to be combined and transmitted through a single optical fiber. The combiner is typically designed to work with an optical fiber bundle, with each optical fiber carrying a separate laser beam (e.g., pump light and/or signal light). For example, an optical fiber bundle including multiple optical fibers that are combined (e.g., fused and tapered) within a combiner may include multiple pump fibers, multiple signal fibers, or a combination of one or more signal fibers and one or more pump fibers. In some cases, to safeguard the delicate optical fibers and components from external disturbances, the combiner may be enclosed in a protective glass casing, referred to as a capillary, that shields the internal components from environmental factors such as temperature fluctuations, moisture, and/or physical damage, among other examples.

Standard combiners typically utilize a capillary structure to hold individual fibers in a compact packing structure where the individual fibers can then be fused. For example, FIG. 1 depicts a typical pump fiber 110 that may be used in a capillary-based combiner, where the pump fiber 110 may have a numerical aperture (NA) in a range between approximately 0.22 to approximately 0.28. As further shown in FIG. 1, the pump fiber 110 may include a core 112 made from fused silica or another suitable material, and a cladding 114 that may be made from fluorine (F)-doped fused silica or another suitable material. Additionally, or alternatively, FIG. 1 depicts example signal fibers 120, 130 that may be used in a capillary-based combiner, where a typical signal fiber may have an NA in a range between approximately 0.06 to approximately 0.15. For example, FIG. 1 depicts an example signal fiber 120 with a core 122 that may be made from germanium (Ge)-doped fused silica or another suitable material, and a cladding 124 that may be made from fused silica or another suitable cladding material. Furthermore, FIG. 1 depicts an example signal fiber 130 with a core 132 that may be made from fused silica or another suitable material, a first cladding 134 surrounding the core 132 that may be made from F-doped fused silica or another suitable cladding material, and a second cladding 136 surrounding the first cladding 134 that may be made from the same material as the core 132 (e.g., fused silica) or another suitable cladding material (e.g., different from the material of the first cladding 136).

Furthermore, FIG. 1 depicts standard capillary structures 140, 150 that may be used to hold various individual fibers forming a fiber bundle (e.g., multiple pump fibers, multiple signal fibers, one or more signal fibers and one or more pump fibers, or the like). For example, FIG. 1 depicts a single layer capillary 140, which is a glass enclosure that includes a single layer 142 that may be made from fused silica, F-doped fused silica, or another suitable material. Additionally, FIG. 1 depicts a dual layer capillary 150, which is a glass enclosure that includes a first layer 152 that may be made from fused silica or another suitable material and a second layer 154 that may be made from F-doped fused silica or another suitable material. Although FIG. 1 illustrates an example of a single layer capillary 140 and a dual layer capillary 150, a capillary structure used to hold various individual fibers included in a fiber bundle may include three or more layers in some cases. However, as discussed in further detail herein with reference to FIGS. 2A-2B, using a standard capillary (e.g., where an inner periphery that defines an opening for enclosing a fiber bundle is circular or substantially circular) suffers from various drawbacks.

As indicated above, FIG. 1 is provided as an example. Other examples may differ from what is described with regard to FIG. 1.

Figure 2A:
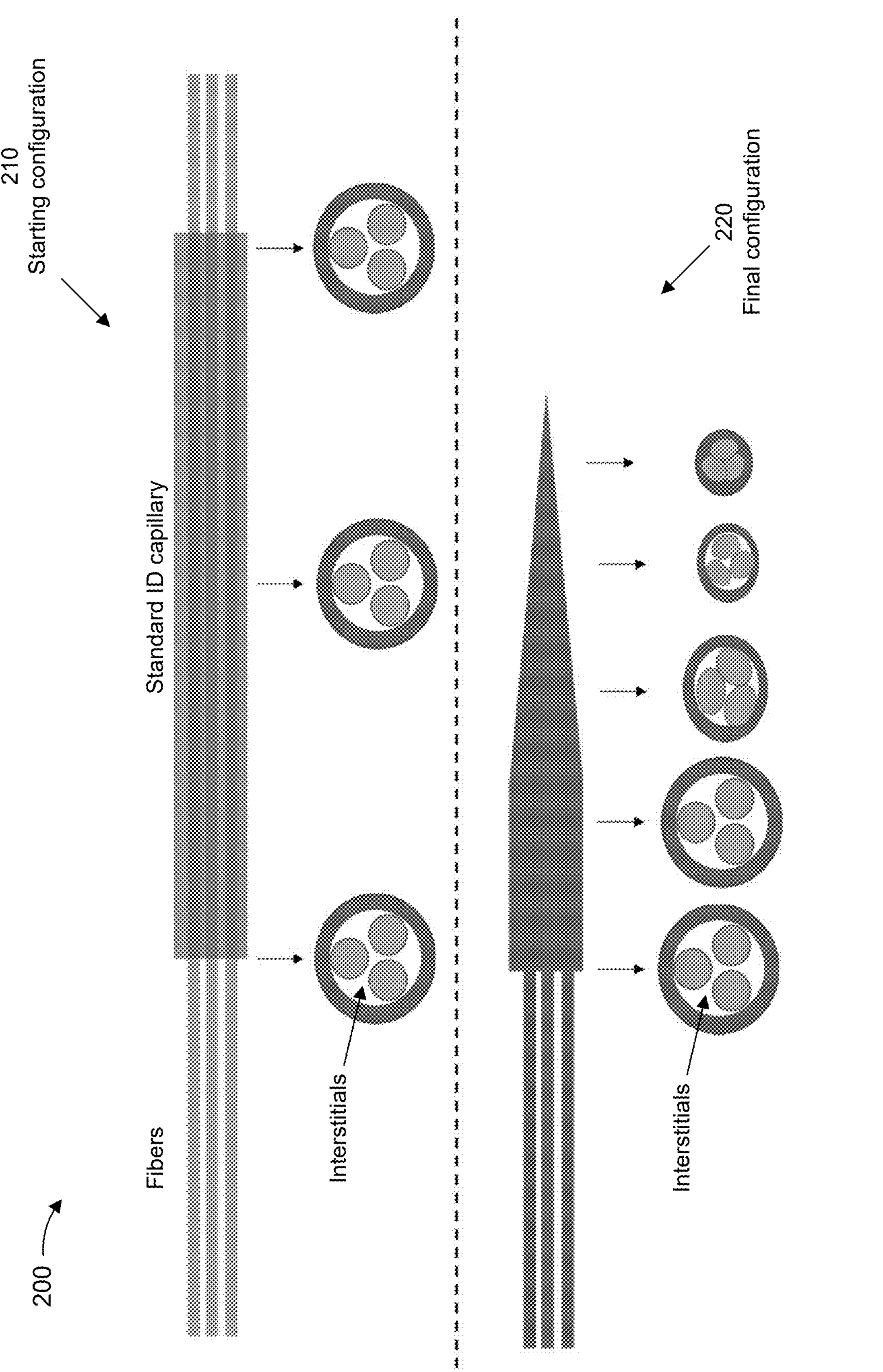
FIGS. 2A-2B are diagrams illustrating an example related to a combiner structure with a capillary having a standard circular shape.
Figure 2B:
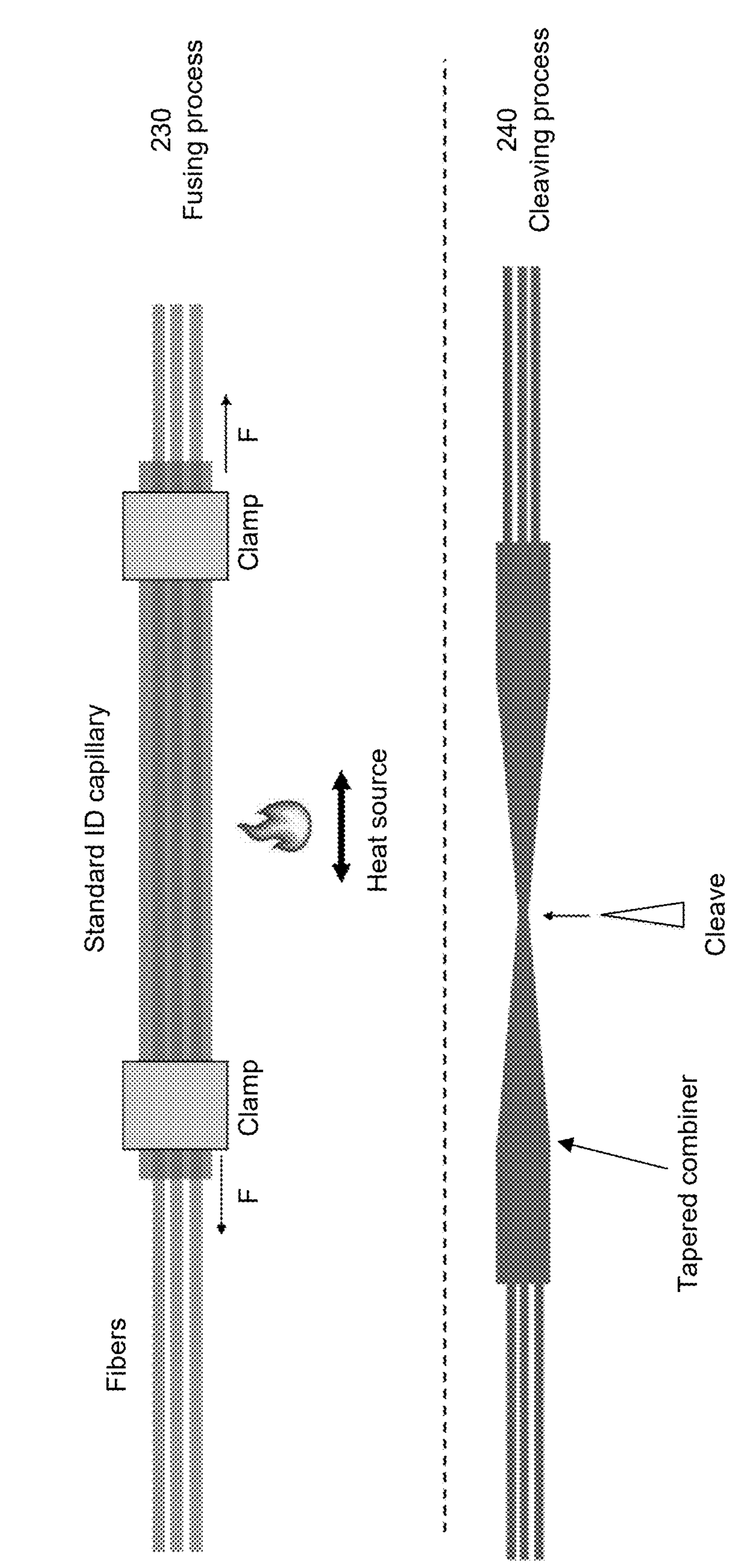

FIGS. 2A-2B are diagrams illustrating an example 200 related to a combiner structure with a capillary having a standard circular shape (e.g., a circular or substantially circular inner periphery to surround and hold various individual fibers forming a fiber bundle).

In a typical combiner with a standard capillary structure (e.g., a capillary structure with a circular or substantially circular inner periphery), multiple optical fibers that form an optical fiber bundle are generally free to rotate and potentially cross over during a manufacturing process, which can present sub-optimal fusing and degradation. For example, FIGS. 2A-2B illustrate an example 200 related to a combiner with a standard capillary structure (e.g., a single-layer or multi-layer capillary). For example, reference number 210 in FIG. 2A corresponds to a starting structure or configuration for a 3:1 combiner, where three input fibers are combined and housed within a standard capillary structure. Furthermore, reference number 220 in FIG. 2A depicts a final configuration of the combiner, where the various input fibers are fused such that the combined input fibers can be spliced to one output fiber (not shown in FIG. 2A). For example, as shown by reference number 230 in FIG. 2B, the capillary structure may be clamped at an input end and an output end after the various fibers forming the fiber bundle have been suitably loaded into the capillary structure. As further shown by reference number 230, a heat source may be applied to the capillary structure to taper the fiber bundle, where the heat source may move along a longitudinal axis of the capillary structure between the clamp at the input end and the clamp at the output end. Applying heat to the capillary structure may cause a glass material (e.g., fused silica or the like) forming the capillary structure to soften such that the glass material can be stretched and tapered, which causes the various fibers in the fiber bundle to be fused toward an output end of the combiner.

As shown by reference number 240, the tapered fiber bundle may then be cleaved at a waist (e.g., a location where the fiber bundle has a minimum diameter), resulting in the final configuration shown by reference number 220 in FIG. 2A. For example, as described herein, a combiner is generally used to transform multiple input fibers (e.g., multiple pump fibers, multiple signal fibers, or a combination of one or more pump fibers and one or more signal fibers) into a single output fiber. Accordingly, an important design goal for a combiner is often to transform the multiple input fibers into a single output as efficiently as possible. For example, one approach to efficiently transform multiple input fibers into a single output is to pack the bundle of fibers being transformed together closely such that the shape of the bundle approaches a circle when the bundled fibers are fused and tapered, which leads to improved splicing and minimal brightness degradation. For example, FIGS. 2A-2B illustrate a case where three fibers are fused together to form a bundled cross-section that is circular or as close to circular as possible. For example, as described herein and shown in FIG. 2B, the glass of each fiber in the fiber bundle is heated, and tension is provided during a fusing process, which creates surface tension. The surface tension has an effect to minimize the surface area around the fiber bundle, which begins to change the shape of the bundle from an initial shape (e.g., triangular or hexagonal) at the input end into a circle at the output end. As further shown by reference number 220 in FIG. 2A, the resulting structure is a combiner with a tapered shape, where the capillary structure is associated with a down-taper from an input end of the capillary structure toward an output end of the capillary structure, such that the various optical fibers forming the fiber bundle are fused into a single optical fiber at the output end of the capillary structure. For example, as shown by the cross-sections of the combiner along the taper in the final configuration of the combiner, an input end of the combiner includes various fibers that are matched (e.g., in location and area) to input fibers coupled to respective laser sources. Near a middle region of the taper, the various fibers start to become more closely fused, reducing the interstitial space between the various fibers. At the output end of the combiner, the various fibers are closely packed and approximate a core of an output fiber that is spliced to the output end of the tapered combiner.

However, when a fiber bundle or multiple optical fibers are loaded into a standard capillary structure (e.g., with a circular or near-circular inner periphery) to safeguard the delicate optical fibers and components from external disturbances, shield the bundled fibers from environmental factors, and/or hold the various individual fibers in a compact packing structure where the individual fibers can then be fused, the shape of the outer periphery of the fiber bundle may mismatch the inner periphery of the capillary structure, which can lead to various problems. For example, when a fiber bundle that includes multiple fibers is loaded into a capillary structure with an inner periphery having a sufficient diameter to receive the fiber bundle, the various individual fibers forming the fiber are free to rotate within the capillary structure, which causes a high risk of the individual fibers twisting, crossing over, and/or jamming. Furthermore, as shown in FIG. 2A, there may be large interstitial regions between the fibers (e.g., unoccupied spaces between the fibers), which can cause significant deformation of the cores and claddings of the fibers in the fiber bundle when the fiber bundle is heated and fused. In addition, when the capillary structure enclosing the fiber bundle is heated to enable tapering and fusing of the various individual fibers, the interstitial regions can cause deformation of the capillary structure (e.g., the material forming the layer(s) of capillary structure may collapse into the interstitial regions, causing the outer periphery of the capillary structure to deform from a circular shape into an irregular shape). Additionally, or alternatively, the interstitial regions in a standard (e.g., circular) capillary structure can lead to poor fusing of the fiber bundle toward the output end, kinking of the fibers included in the fiber bundle, and/or other problems that may lead to loss and/or degradation of the light to be combined within the combiner. The large interstitial regions can also lead to bubbles during the fusing process and act as vectors for contamination.

Accordingly, as described herein, using a standard capillary structure (e.g., with a round, circular, or substantially circular inner periphery) to house or otherwise enclose multiple fibers forming a fiber bundle can pose various challenges, including an increased risk of twist, crossover, jamming, fiber deformation, capillary deformation, poor bundle fusing, and/or kinking, all of which can contribute to loss and/or degradation (e.g., power loss and/or degraded brightness) within the combiner. Furthermore, although other techniques may be used to hold or otherwise enclose a fiber bundle while various fibers are fused and tapered to form a combiner, such as drilling holes in a glass rod and feeding the fibers to be fused through the holes prior to fusing, such techniques tend to be complicated processes that are limited to the specific size (e.g., diameter and/or length) of the hole(s) that can be drilled, and/or shaping the individual fiber claddings to form a round cross-section, which poses additional manufacturing challenges.

Accordingly, as described in further detail herein with reference to FIGS. 3A-3E, some implementations described herein relate to a combiner that uses a shaped capillary structure to control the individual fibers during the manufacturing process, maximize brightness conversion, and improve manufacturability. For example, as described herein, a fiber bundle that includes multiple optical fibers to be combined within a combiner may be associated with a packing geometry that defines a shape of an outer periphery of the fiber bundle. Accordingly, the high-brightness combiner may include a shaped capillary structure to surround the fiber bundle, where the shaped capillary structure includes an outer periphery (e.g., a circular outer periphery) and an inner periphery shaped to correspond to the shape of the outer periphery of the fiber bundle. In this way, the multiple fibers that form the fiber bundle may be held in the desired packing shape, which simplifies a process to load the fiber bundle or the various fibers forming the fiber bundle into the capillary structure (e.g., avoiding or minimizing fiber twist, fiber crossover, and/or fiber jamming). Furthermore, because the shape of the inner periphery of the capillary structure matches the shape of the outer periphery of the fiber bundle, a size of the interstitial region(s) between the bundled optical fibers is reduced relative to a capillary structure with a circular or substantially circular inner periphery, which minimizes or reduces fiber deformation during fusing, maintains circularity of the fiber bundle, minimizes or reduces air gaps, and/or minimizes or reduces contamination, among other examples.

As indicated above, FIGS. 2A-2B are provided as an example. Other examples may differ from what is described with regard to FIGS. 2A-2B.

FIGS. 3A-3E are diagrams illustrating examples 300 associated with a high-brightness combiner with a shaped capillary structure. For example, referring to FIG. 3A, reference number 310 corresponds to a starting structure for a 3:1 combiner with a shaped capillary structure, where three input fibers are combined and housed within a shaped capillary structure. For example, as described herein, the shaped capillary structure may generally correspond to a glass enclosure that includes one or more layers to surround a fiber bundle that includes multiple fibers to be fused and tapered into a single output, where the capillary structure includes an outer periphery with a circular or substantially circular shape and an inner periphery that is shaped to correspond to a shape of an outer periphery of the fiber bundle. Accordingly, as shown by reference number 320 in FIG. 3B, the multiple input fibers may then be fused into one output fiber using similar techniques as described above with reference to FIG. 2B.

For example, in some implementations, multiple fibers that form a fiber bundle may be loaded into the shaped capillary structure (e.g., individually or collectively, depending on a number and/or symmetry of the fiber bundle). In some implementations, the fiber bundle may be preassembled or otherwise arranged in a bundled configuration, and an entirety of the fiber bundle may then be loaded into the shaped capillary structure. Additionally, or alternatively, each individual fiber included in the fiber bundle may be sequentially loaded into the shaped capillary structure, within the inner periphery of the shaped capillary structure. Additionally, or alternatively, one or more subsets of the fibers included in the fiber bundle may be sequentially loaded into the shaped capillary structure until all of the fibers forming the fiber bundle have been loaded within the inner periphery of the shaped capillary structure. For example, in an N:1 combiner, where N is an integer having a value greater than or equal to 2 (e.g., a 12:1, 13:1, 15:1, or 19:1 combiner, as shown in FIGS. 3C-3D), a first subset of the input fibers that corresponds to outermost fibers may be loaded into the shaped capillary structure, and one or more additional subsets of the input fibers that correspond to inner fibers may then be loaded into the shaped capillary structure until all of the fibers have been suitably loaded within the capillary structure.

In some implementations, after the fiber bundle has been loaded into the shaped capillary structure, the shaped capillary structure may be clamped at an input end and clamped at an output end, and a heat source may be applied to taper the fiber bundle. In some implementations, the tapered bundle may then be cleaved at a waist to form the combiner. In some implementations, prior to the heating, tapering, and fusing process, the various fibers that form the fiber bundle may be processed to match the shape of the shaped capillary (or vice versa), and loaded within the shaped capillary. In this way, the bundled fibers are held within the desired packing shape, which simplifies the process to load the bundled fibers into the shaped capillary structure (e.g., avoiding fiber twist and/or fiber crossover). Furthermore, because the bundled fibers match the capillary shape, the shaped capillary can minimize or reduce the interstitial space between the fibers, which minimizes fiber deformation during the tapering and/or fusing process, maintains circularity of the fiber bundle, reduces air gaps, and/or reduces contamination.

Figure 3A:
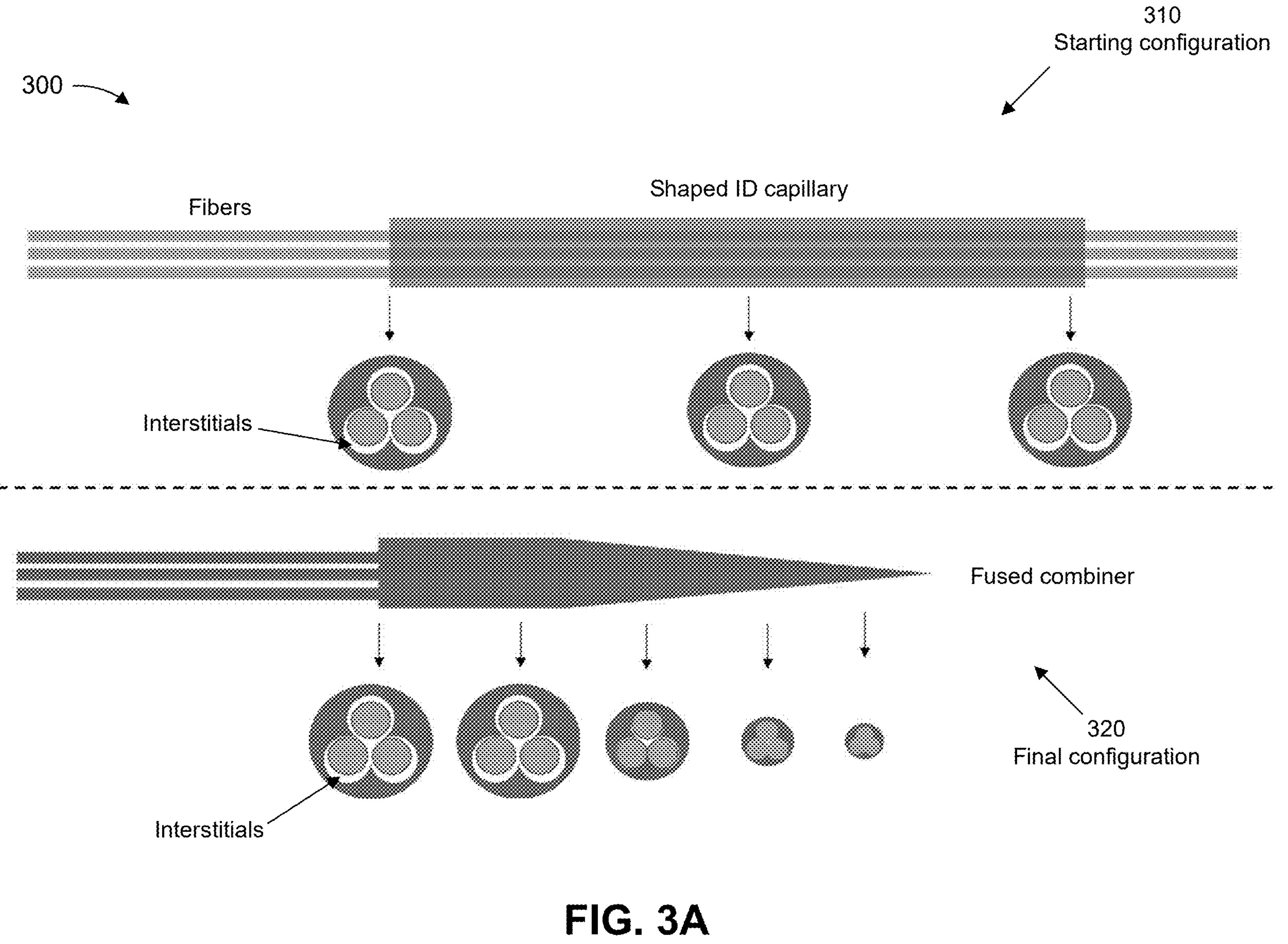
FIGS. 3A-3E are diagrams illustrating examples associated with a high-brightness combiner with a shaped capillary structure.
Figure 3B:
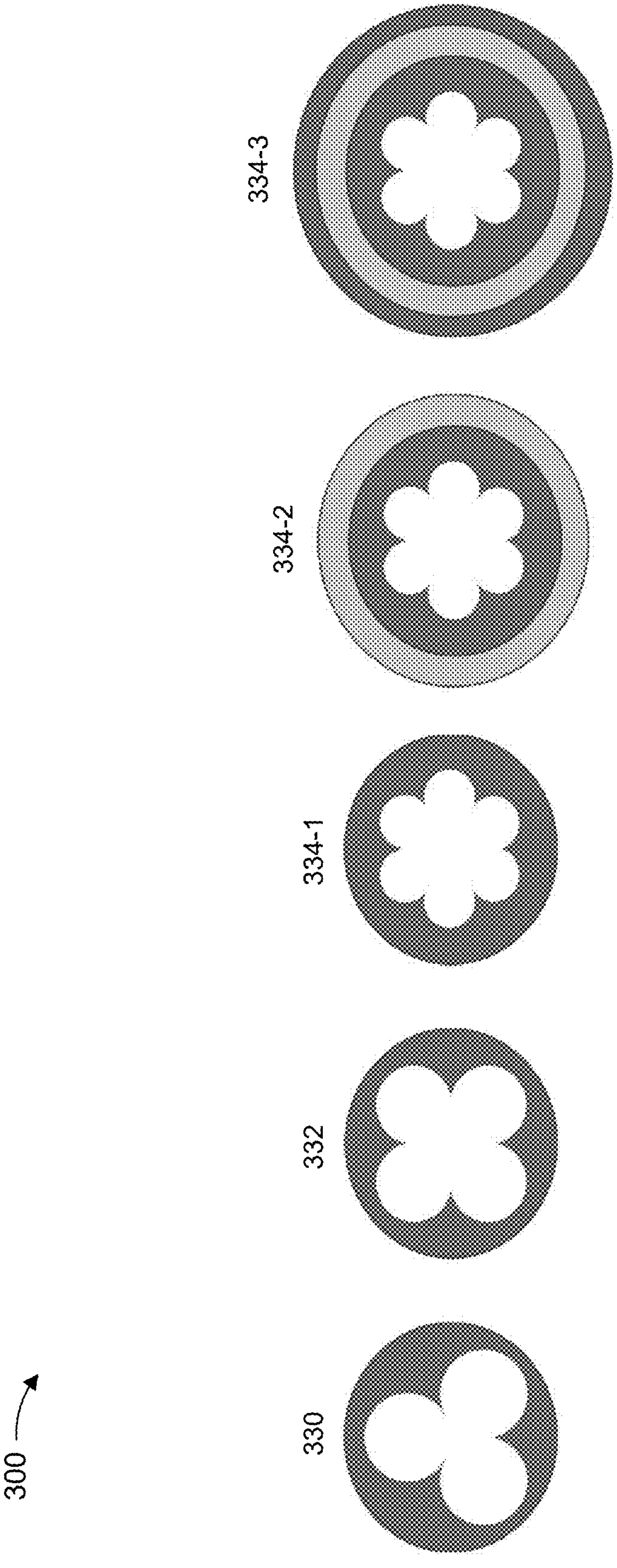
Figure 3C:
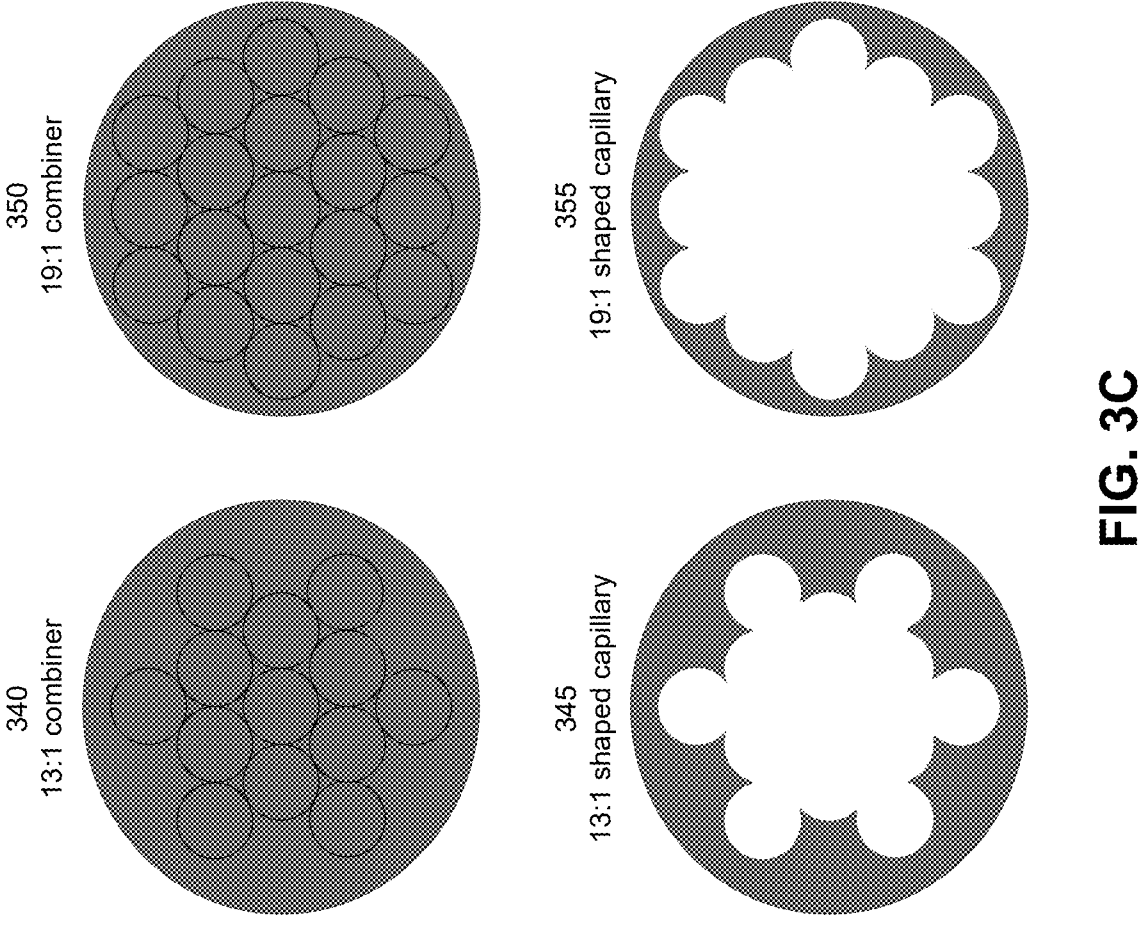
Figure 3D:
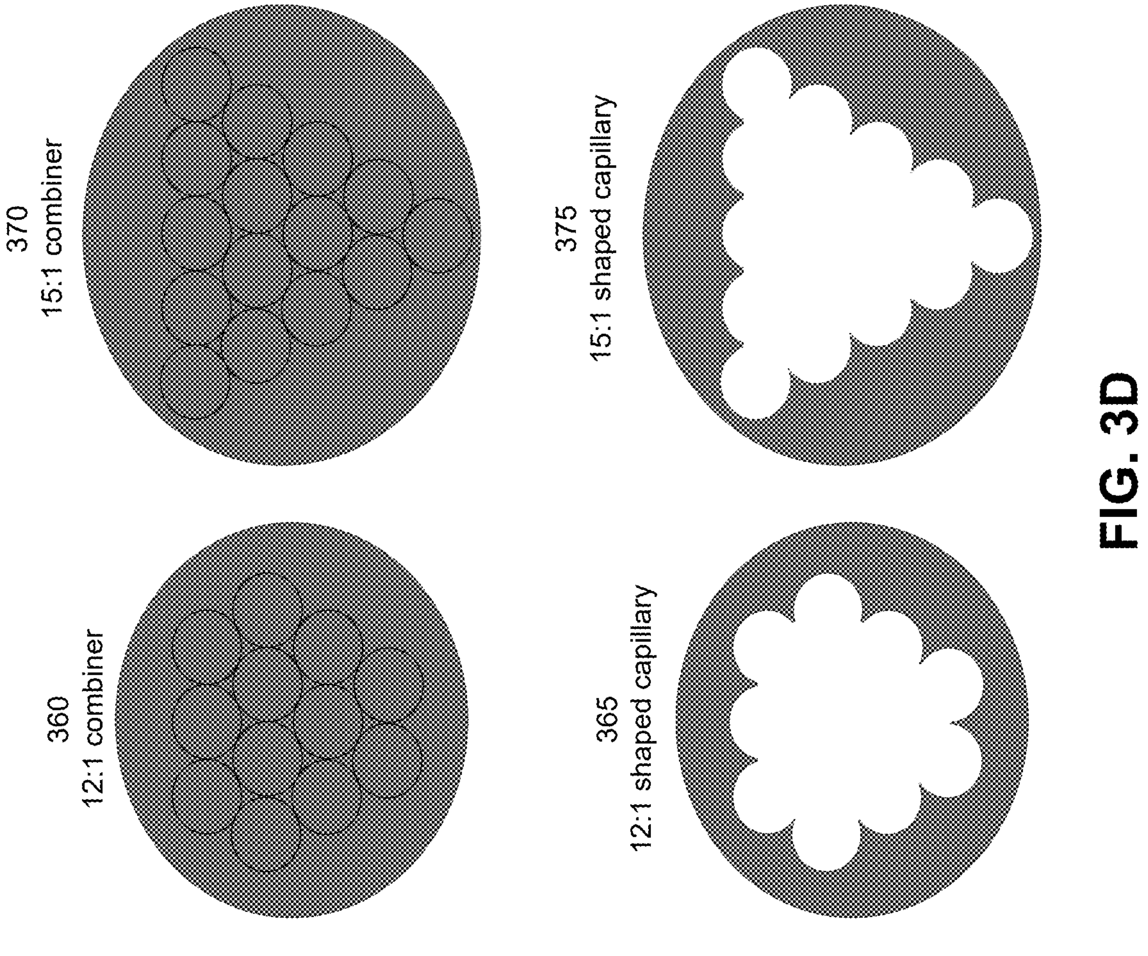

As shown in FIG. 3B, the inner periphery of the shaped capillary structure may generally match a shape of the fiber bundle being fused within the shaped capillary structure, and the shaped capillary structure may be a single-layer capillary structure, or a multi-layer capillary structure (e.g., including two or more layers). For example, in FIG. 3B, reference number 330 corresponds to a shaped capillary structure for a 3:1 combiner, reference number 332 corresponds to a shaped capillary structure for a 4:1 combiner, and reference numbers 334-1 through 334-3 correspond to shaped capillary structures for a 7:1 combiner. For example, reference number 334-1 corresponds to a shaped capillary structure for a single-layer 7:1 combiner (e.g., where a single layer of glass material surrounds a fiber bundle), reference number 334-2 corresponds to a shaped capillary structure for a dual-layer 7:1 combiner (e.g., where a second layer of glass material, formed from a different material or a doped version of the material used in the first layer, surrounds the first layer), and reference number 334-3 corresponds to a shaped capillary structure for a triple-layer 7:1 combiner (e.g., where a third layer of glass material, surrounding the second layer of glass material, is formed from the same material as the first layer, a different material than used in the second layer, or a doped version of the material used in the second layer).

In general, the shape of a shaped capillary structure can be optimized for any suitable fiber bundle (e.g., a fiber bundle including any suitable number, size, and/or type of optical fibers), such as a fiber bundle used in a pump combiner (e.g., including multiple pump fibers), a fiber bundle used in a signal combiner (e.g., including multiple signal fibers), and/or a fiber bundle used in a pump/signal combiner (e.g., including one or more pump fibers and one or more signal fibers). For example, FIGS. 3C-3D illustrate example fiber bundles and corresponding shaped capillary structures for optical fibers including different quantities of optical fibers. For example, reference number 340 corresponds to a 13:1 combiner with an improved packing, and reference number 345 corresponds to a shaped capillary structure with a shaped inner periphery that matches or otherwise corresponds to the improved packing of the 13:1 combiner. Furthermore, reference number 350 corresponds to a 19:1 combiner with an improved packing, and reference number 355 corresponds to a shaped capillary structure with a shaped inner periphery that matches or otherwise corresponds to the improved packing of the 19:1 combiner. Similarly, referring to FIG. 3D, reference number 360 corresponds to a 12:1 combiner with an improved packing, with reference number 365 corresponding to a shaped capillary structure with a shaped inner periphery that matches or otherwise corresponds to the improved packing of the 12:1 combiner, and reference number 370 corresponds to a 15:1 combiner with an improved packing, with reference number 375 corresponding to a shaped capillary structure with a shaped inner periphery that matches or otherwise corresponds to the packing of the 15:1 combiner.

Figure 3E:
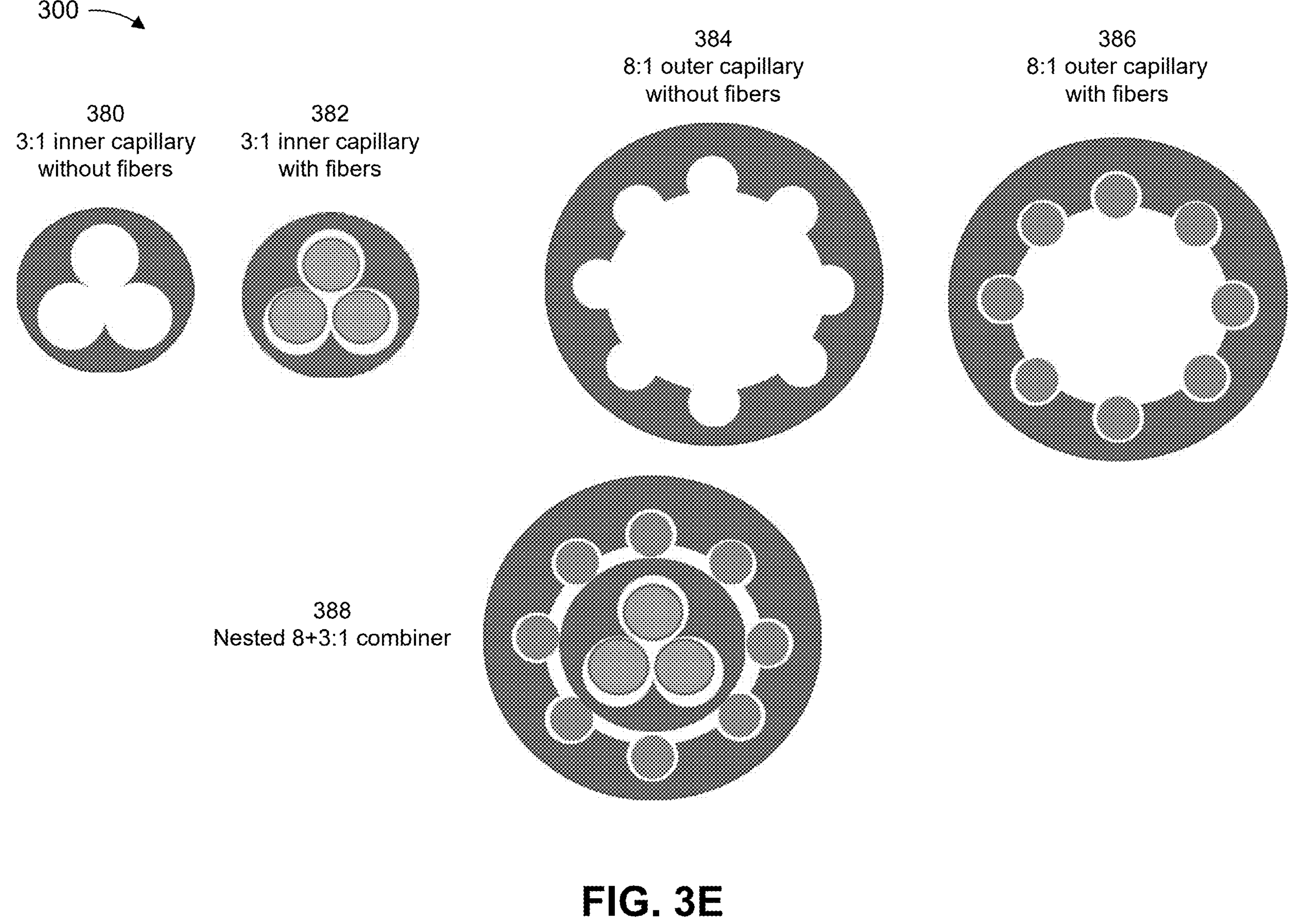

In some implementations, the various fibers that are bundled within the shaped capillary structure may each be the same size (e.g., diameter), or may be associated with different sizes. For example, in cases where the various fibers that are bundled within the shaped capillary structure have the same size, the various fibers included in the fiber bundle may have equal diameters. Additionally, or alternatively, in cases where the various fibers that are bundled within the shaped capillary structure have different sizes, the various fibers included in the fiber bundle may include at least a first optical fiber with a first diameter and a second optical fiber with a second diameter. Furthermore, in some implementations, the shape of the inner periphery of the shaped capillary structure can be suitably modified to accommodate symmetric fiber bundles (e.g., where the packing geometry of the various fibers is symmetric in one or more axes), asymmetric fiber bundles (e.g., where the packing geometry of the various fibers is asymmetric in one or more axes), and/or fiber bundles that include optical fibers with different diameters. Furthermore, in some implementations, an outer diameter (OD) or outer periphery of the shaped capillary structure can be shaped to be round, hexagonal, or another suitable shape. Additionally, or alternatively, the shaped capillary structure can include one or more additional layers, surrounding an inner layer forming the inner periphery, which may be formed from a different material than the inner layer and/or a doped version of the material used in the inner layer. Additionally, or alternatively, the shaped capillary structure may be grooved for one or more pump fibers to fit around the OD of the shaped capillary structure (e.g., for a multi-signal pump/signal combiner). For example, FIG. 3E illustrates an example of a nested capillary structure, where the capillary structure includes multiple shaped layers to match the packing geometry of multiple layers of optical fibers. For example, reference number 380 corresponds to a 3:1 inner capillary structure without any fibers loaded into the inner capillary structure, and reference number 382 corresponds to the 3:1 inner capillary structure with a fiber bundle that includes three input fibers loaded into the inner capillary structure. Furthermore, reference number 384 corresponds to an 8:1 outer capillary structure without any fibers loaded into the outer capillary structure, and reference number 386 corresponds to the 8:1 outer capillary structure with a fiber bundle that includes eight input fibers loaded into the outer capillary structure. Accordingly, as further shown in FIG. 3E, and by reference number 388, the outer capillary structure may be arranged to enclose the inner capillary structure, where the inner capillary structure and the outer capillary structure each include a circular outer periphery and a shaped inner periphery that matches a shape of an outer periphery of the bundled fibers that are enclosed or otherwise housed within the respective capillary structures (or layers). Additionally, or alternatively, as described elsewhere herein, the outer peripheries (or outer diameters) of the inner layer and/or the outer layer of the capillary structure may be shaped as-needed (e.g., to be round or circular, hexagonal, or grooved to fit one or more fibers around the respective layer of the capillary structure). For example, in context with FIG. 3E, the inner layer of the capillary structure (e.g., shown by reference numbers 380 and 382) may be shaped (e.g., grooved, etched, or otherwise shaped) to fit the fibers that are provided between the outer periphery of the inner layer and the inner periphery of the outer layer.

As indicated above, FIGS. 3A-3E are provided as examples. Other examples may differ from what is described with regard to FIGS. 3A-3E.

Figure 4:
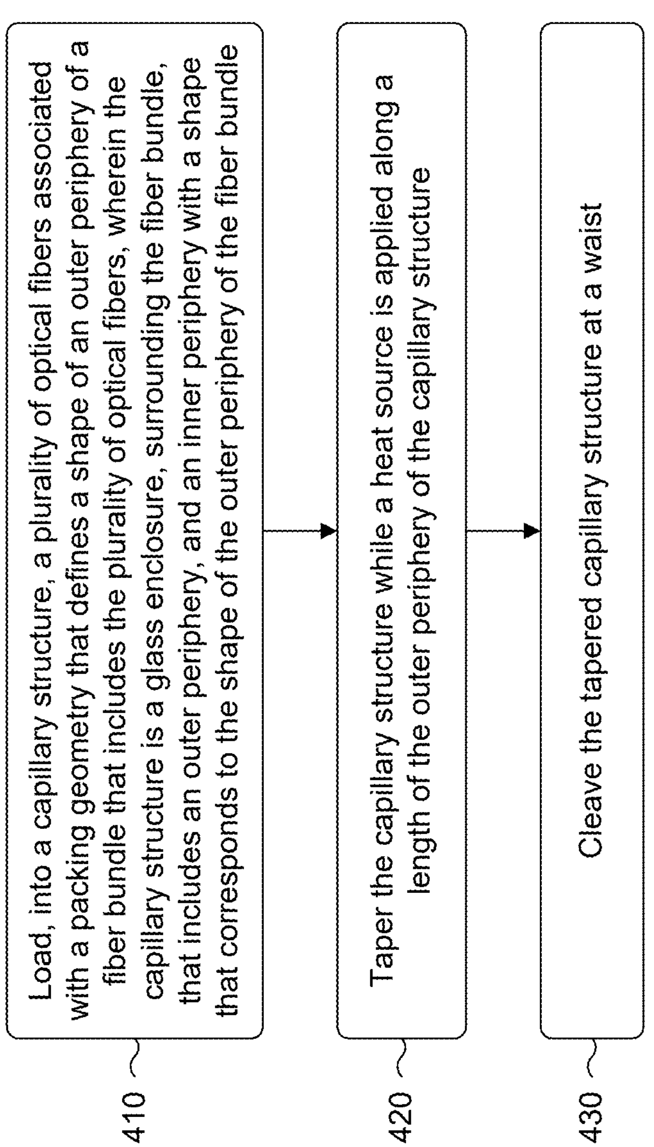
FIG. 4 is a flowchart of an example process associated with a high-brightness combiner with a shaped capillary structure.

FIG. 4 is a flowchart of an example process 400 associated with a high-brightness combiner with a shaped capillary structure. In some implementations, one or more process blocks of FIG. 4 are performed by a manufacturing system that can fuse and taper various fibers that form a fiber bundle.

As shown in FIG. 4, process 400 may include loading, into a capillary structure, a plurality of optical fibers associated with a packing geometry that defines a shape of an outer periphery of a fiber bundle that includes the plurality of optical fibers, wherein the capillary structure is a glass enclosure, surrounding the fiber bundle, that includes an outer periphery, and an inner periphery with a shape that corresponds to the shape of the outer periphery of the fiber bundle (block 410). For example, in some implementations, the fiber bundle may be preassembled according to the packing geometry that defines the shape of the outer periphery of the fiber bundle, and the entire fiber bundle may be loaded into the capillary structure with the inner periphery that is shaped to correspond to the shape of the outer periphery of the fiber bundle. Additionally, or alternatively, in some implementations, the multiple fibers forming the fiber bundle may be loaded into the capillary structure individually, or in one or more subsets.

As further shown in FIG. 4, process 400 may include tapering the capillary structure while a heat source is applied along a length of the outer periphery of the capillary structure (block 420).

As further shown in FIG. 4, process 400 may include cleaving the tapered capillary structure at a waist (block 430).

Process 400 may include additional implementations, such as any single implementation or any combination of implementations described below and/or in connection with one or more other processes described elsewhere herein.

In a first implementation, the plurality of optical fibers includes a plurality of pump fibers, a plurality of signal fibers, or a combination of one or more signal fibers and one or more pump fibers.

In a second implementation, alone or in combination with the first implementation, the shape of the inner periphery of the capillary structure reduces a size of one or more interstitial regions between the plurality of optical fibers along the capillary structure relative to a capillary structure with a non-shaped inner periphery.

In a third implementation, alone or in combination with one or more of the first and second implementations, the capillary structure is associated with a down-taper from an input end of the capillary structure toward an output end of the capillary structure, such that the plurality of optical fibers is fused into a single optical fiber at the output end of the capillary structure.

In a fourth implementation, alone or in combination with one or more of the first through third implementations, the glass enclosure surrounding the fiber bundle is a first layer of the capillary structure, and the capillary structure further comprises a second layer, surrounding the first layer, formed from a different material than a material used in the first layer or a doped version of the material used in the first layer.

In a fifth implementation, alone or in combination with one or more of the first through fourth implementations, the capillary structure further comprises a third layer, surrounding the second layer, formed from one or more of the materials used in the first layer, a different material than a material used in the second layer, or a doped version of the material used in the second layer.

In a sixth implementation, alone or in combination with one or more of the first through fifth implementations, the capillary structure is an inner capillary structure, and the high-brightness combiner further comprises an outer capillary structure, surrounding the inner capillary structure such that the inner capillary structure is nested within the outer capillary structure, wherein the outer capillary structure comprises an inner periphery that has a shape that corresponds to a shape of an outer periphery of one or more optical fibers that are provided in a second fiber bundle between the inner capillary structure and the outer capillary structure.

In a seventh implementation, alone or in combination with one or more of the first through sixth implementations, the plurality of optical fibers in the fiber bundle have a symmetric packing geometry.

In an eighth implementation, alone or in combination with one or more of the first through seventh implementations, the plurality of optical fibers in the fiber bundle have an asymmetric packing geometry.

In a ninth implementation, alone or in combination with one or more of the first through eighth implementations, the plurality of optical fibers in the fiber bundle have equal diameters.

In a tenth implementation, alone or in combination with one or more of the first through ninth implementations, the plurality of optical fibers in the fiber bundle include at least a first optical fiber with a first diameter and a second optical fiber with a second diameter.

In an eleventh implementation, alone or in combination with one or more of the first through tenth implementations, the outer periphery of the capillary structure is shaped to fit, around the outer periphery, one or more fibers that are provided in a second fiber bundle.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A high-brightness combiner, comprising:

a fiber bundle that comprises a plurality of optical fibers associated with a packing geometry that defines a shape of an outer periphery of the fiber bundle; and a capillary structure, comprising a glass enclosure surrounding the fiber bundle, wherein the capillary structure includes:

an outer periphery, and an inner periphery with a shape that corresponds to the shape of the outer periphery of the fiber bundle, wherein the inner periphery is hollow within the shape that corresponds to the shape of the outer periphery of the fiber bundle.

2. The high-brightness combiner of claim 1, wherein the plurality of optical fibers includes a plurality of pump fibers, a plurality of signal fibers, or a combination of one or more signal fibers and one or more pump fibers.

3. The high-brightness combiner of claim 1, wherein the shape of the inner periphery of the capillary structure reduces a size of one or more interstitial regions between the plurality of optical fibers along the capillary structure relative to a capillary structure with a non-shaped inner periphery.

4. The high-brightness combiner of claim 1, wherein the capillary structure is associated with a down-taper from an input end of the capillary structure toward an output end of the capillary structure, such that the plurality of optical fibers is fused into a single optical fiber at the output end of the capillary structure.

5. The high-brightness combiner of claim 1, wherein the glass enclosure surrounding the fiber bundle is a first layer of the capillary structure, and wherein the capillary structure further comprises:

a second layer, surrounding the first layer, formed from a different material than a material used in the first layer or a doped version of the material used in the first layer.

6. The high-brightness combiner of claim 5, wherein the capillary structure further comprises:

a third layer, surrounding the second layer, formed from one or more of the materials used in the first layer, a different material than a material used in the second layer, or a doped version of the material used in the second layer.

7. The high-brightness combiner of claim 1, wherein the capillary structure is an inner capillary structure, and wherein the high-brightness combiner further comprises:

an outer capillary structure, surrounding the inner capillary structure such that the inner capillary structure is nested within the outer capillary structure, wherein the outer capillary structure comprises an inner periphery that has a shape that corresponds to a shape of an outer periphery of one or more optical fibers that are provided in a second fiber bundle between the inner capillary structure and the outer capillary structure.

8. The high-brightness combiner of claim 1, wherein the plurality of optical fibers in the fiber bundle have a symmetric packing geometry.

9. The high-brightness combiner of claim 1, wherein the plurality of optical fibers in the fiber bundle have an asymmetric packing geometry.

10. The high-brightness combiner of claim 1, wherein the plurality of optical fibers in the fiber bundle have equal diameters.

11. The high-brightness combiner of claim 1, wherein the plurality of optical fibers in the fiber bundle include at least a first optical fiber with a first diameter and a second optical fiber with a second diameter.

12. The high-brightness combiner of claim 1, wherein the outer periphery of the capillary structure is shaped to fit, around the outer periphery, one or more fibers that are provided in a second fiber bundle.

13. A shaped capillary, comprising:

a glass enclosure to surround a fiber bundle that comprises a plurality of optical fibers associated with a packing geometry that defines a shape of an outer periphery of the fiber bundle, wherein the glass enclosure comprises:

an outer periphery, and an inner periphery with a shape that corresponds to the shape of the outer periphery of the fiber bundle, wherein the inner periphery is hollow within the shape that corresponds to the shape of the outer periphery of the fiber bundle.

14. The shaped capillary of claim 13, wherein the shape of the inner periphery reduces a size of one or more interstitial regions between the plurality of optical fibers relative to a capillary structure with a circular inner periphery.

15. The shaped capillary of claim 13, wherein the glass enclosure is a first layer of the shaped capillary, and wherein the shaped capillary further comprises:

a second layer, surrounding the first layer, formed from a different material than a material used in the first layer or a doped version of the material used in the first layer.

16. The shaped capillary of claim 13, wherein the plurality of optical fibers in the fiber bundle have a symmetric packing geometry.

17. The shaped capillary of claim 13, wherein the plurality of optical fibers in the fiber bundle have an asymmetric packing geometry.

18. The shaped capillary of claim 13, wherein the plurality of optical fibers in the fiber bundle have equal diameters.

19. The shaped capillary of claim 13, wherein the plurality of optical fibers in the fiber bundle include at least a first optical fiber with a first diameter and a second optical fiber with a second diameter.

20. A method for fabricating a high-brightness combiner, comprising:

loading, into a capillary structure, a plurality of optical fibers associated with a packing geometry that defines a shape of an outer periphery of a fiber bundle that includes the plurality of optical fibers, wherein the capillary structure is a glass enclosure, surrounding the fiber bundle, that includes:

an outer periphery, and an inner periphery with a shape that corresponds to the shape of the outer periphery of the fiber bundle, wherein the inner periphery is hollow within the shape that corresponds to the shape of the outer periphery of the fiber bundle;

tapering the capillary structure while a heat source is applied along a length of the outer periphery of the capillary structure; and cleaving the tapered capillary structure at a waist.

* * * * *